(12) United States Patent
Bender et al.

(10) Patent No.: US 6,807,541 B2
(45) Date of Patent: Oct. 19, 2004

(54) WEAK RECORD LOCKS IN DATABASE QUERY READ PROCESSING

(75) Inventors: Daniel Dean Bender, Oronoco, MN (US); Thomas Owen McKinley, Rochester, MN (US); Robert Paul Mech, Rochester, MN (US); Robert Anthony Petrillo, Lanesboro, MN (US); Richard Miles Rocheleau, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 10/085,441

(22) Filed: Feb. 28, 2002

(65) Prior Publication Data

US 2003/0163494 A1 Aug. 28, 2003

(51) Int. Cl.$^7$ ............................................... G06F 17/30
(52) U.S. Cl. ............................................... 707/8; 707/1
(58) Field of Search .............................. 707/2, 3, 4, 6, 707/10, 101, 102, 8, 202, 103 R; 710/200; 711/100; 717/130; 718/104

(56) References Cited

U.S. PATENT DOCUMENTS

| | | | | |
|---|---|---|---|---|
| 5,355,477 A | * | 10/1994 | Strickland et al. ............. | 707/8 |
| 5,414,839 A | * | 5/1995 | Joshi .............................. | 707/8 |
| 5,455,944 A | * | 10/1995 | Haderle et al. ............. | 707/202 |
| 5,715,447 A | * | 2/1998 | Hayashi et al. ................. | 707/8 |
| 6,009,269 A | * | 12/1999 | Burrows et al. ............. | 717/130 |

* cited by examiner

Primary Examiner—Diane D. Mizrahi
Assistant Examiner—Apu M Mofiz
(74) Attorney, Agent, or Firm—Wood, Herron & Evans, LLP

(57) ABSTRACT

A weak record locking scheme that, while enforcing serialization of record updates, permits a read to extract data from uncommitted updates. Specifically, records are locked in association with a process or thread performing a lock. When the records affected by a transaction are initially locked for reading or updating, they are locked at the process level. When a particular record is to be read or updated as part of a transaction, it is locked at the thread level. A read transaction that will accept uncommitted changes uses a weak lock to lock the record for reading. A weak lock may be made on a record so long as the record is not already locked for updating at the thread level. While a record is weakly locked for reading, it cannot be locked for updating at the thread level. A record may thus be weakly locked even though the record is locked for updating at the process level by the same process. Weak locking thus preserves serialization of updates, while reducing delays caused by locking conflicts.

20 Claims, 4 Drawing Sheets

WEAK RECORD LOCKS IN DATABASE QUERY READ PROCESSING

FIELD OF THE INVENTION

The present invention relates to processing of database queries in a relational database system.

BACKGROUND OF THE INVENTION

In a relational database, data is typically stored in the forms of records, each record being a member of a relation or table of records, and having fields defined for that relation. Fields in one relation may be linked to fields in other relations to form a relational database.

Such databases are increasingly used in multi-user and multi-processing or multi-threaded environments, where the records are being regularly read and updated as part of the business routine of the sponsoring organization. Such environments pose a challenge to database software design, for the reason that record updates and reads need to be managed to ensure accuracy and consistency of results. For example, a simultaneous update and read of data from a record, poses a risk that the data read from the record will be internally inconsistent, for the reason that only some but not all of the data in the record was updated prior to the read. Furthermore, if a given field is read at the same time that it is being updated, the resulting data value may be incomplete or inaccurate, creating errors such as a data type mismatch. Simultaneous updating of records poses a similar risk of inaccuracy or inconsistency, for the reason that some, but not all, of the changes made by one update may be overwritten by changes made by the other update, leaving inconsistent or inaccurate data in the records.

In view of these issues, in some implementations, database software includes methods for locking records to ensure that updates and reads of records are accurate and consistent. For example, in one conventional scheme, as part of a read transaction, a record being read is first locked, to prevent any updating of that record outside of that transaction until the read transaction is complete. If a record is being updated, then that record will be locked for updating, and the record will not be read, until it becomes available and can be locked for the read transaction. After the read transaction is completed, all locked records are unlocked. Similarly, as part of an update transaction, a records that is subject to the update transaction is locked for updating, to prevent any reading or updating of that record outside of that transaction until the transaction is complete. If the record has already been locked for reading, then the record will not be updated, until it becomes available and can be locked for the update transaction. After the update transaction is completed, all locked records are unlocked (and the changes made are thereby "committed").

While record locking schemes of the kind described ensure consistency by enforcing a transaction-based updating and reading of data, and further ensure that uncommitted records are not read, these schemes suffer from drawbacks, namely, delays inherent in locking all records involved in both read and update transactions.

One improvement, used in products of the assignee of the present invention, is multi-level scoping of record locks. Specifically, in record lock scoping, each record lock, when created by a thread, is associated with that threads' process. When the record is being actively read or updated by a thread, the record lock is associated with the thread that is actively updating or reading the record. The scoping of the lock affects the conflict behavior of the lock, and in some cases alleviates delays. Specifically, if a thread is seeking to create a read lock on a record on behalf of a process, while the same process holds an update lock on the record, the read lock can be established. Similarly, if a thread seeks to create an update lock on a record on behalf of its process while the same process holds a read lock on the record, the update lock can be established. In both cases, the use of multi-level (process and thread) scoping of locks avoids a conflict and a delay. The delay is avoided when locks are created at the process level, because later thread-scoped locking will detect and resolve any conflicts. Specifically, when a thread seeks to actively read a particular record, it must associate the lock on the record with the thread. At that point, if another thread in the same process, (or another process) holds an update lock on the record, a conflict will occur. Similarly, when a thread seeks to actively update a particular record, it must associate the lock on the record with the thread. If another thread in the same process (or another process) holds a read or update lock on the record, a conflict will occur. Notably, if a thread seeks an update lock while the same thread has a read lock, no conflict will occur: because the same thread is performing the read and update, there is an inherent serialization of activity that will protect record integrity.

While scoping of record locks, as described above, relieves some of the delays inherent in the record locking approach, while maintaining transactional integrity, in some cases maintaining transactional integrity, and the resulting delays, are unnecessary. As a consequence, it has been known to permit read transactions without record locking. In this case, inconsistent results may be obtained, for the reason that uncommitted updates created by other processes or threads, may be reflected in the read results. However, such inconsistencies may be acceptable in some situations, as defined by the database programmer.

Unfortunately, departing from the record locking scheme described above, by permitting unlocked reading of data, invites errors. The record locking scheme described above, inherently enforces serialization of activity with respect to individual records; that is, by virtue of the use of locking, a particular record cannot be read and updated simultaneously. If unlocked read transactions are permitted, data can be extracted from a record that is currently being modified. As noted, dramatic errors may result if an individual record is simultaneously read and updated. Accordingly, some type of serialization must take place at the record level when unlocked reads are permitted.

One known way to enforce serialization, independently of record locking, uses check counters. In this scheme, a counter is associated with each record. Each time the record is updated, the counter for the record is incremented. When a record is read, therefore, it can be determine whether the record was updated while being read, by accessing the counter prior to and after the read, and if the counter values do not match, retrying the read. This solution, while workable, has the drawback that potentially multiple retries may be required before a record is successfully read, and there is substantial overhead in maintaining and updating the counters separately from record locking. To avoid the second problem, each counter may be made applicable to a group of records, rather than an individual records, but in that case the likelihood for retries increases.

Another known solution is the use of independent "seizing" of records at the record level. Thus, an update transaction would need to acquire an exclusive seize on each record prior to updating that record, and release the seize when modification is complete. A read transaction would acquire a shared seize on each record while extracting data from it, and release the seize when reading is complete. (This step may be taken by every read transaction or, in a combined approach also using a check counter, only by those read transactions that have initiated retry(s) due to check counter changes.) When a shared seize is attempted on an exclusively seized record, or vice-versa, a conflict is registered, and the transaction attempting to create the second, conflicting seize, is paused until the record is released from the existing seize. A drawback of this approach is, again the overhead required to manage the seizes separately from record locking.

SUMMARY OF THE INVENTION

The foregoing difficulties are overcome in accordance with principles of the present invention, by an enhancement to record locking that, while enforcing serialization of record updates, permits a read to extract data from uncommitted updates. Specifically, in accordance with principles of the present invention, the records affected by a transaction, including a particular record, are locked for updating at the beginning of the transaction. While the particular record is locked for updating, that particular record may, however, still be read in a transaction that will accept uncommitted changes. Specifically, when the record is to be read in such a transaction, it is weakly locked for reading. While the record is weakly locked for reading, the record cannot be updated for the transaction; only after the record is read and no longer weakly locked, can the record be updated.

In the specific embodiment described below, records are locked in association with a process or thread performing a lock. When the records affected by a transaction are initially locked for reading or updating, they are locked at the process level. When a particular record is to be read or updated as part of a transaction, it is locked at the thread level. A record may be weakly locked for reading, for the purposes of a read transaction that will accept uncommitted changes, so long as the record is not locked for updating at the thread level. When a record is weakly locked for reading, it cannot be locked for updating at the thread level.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
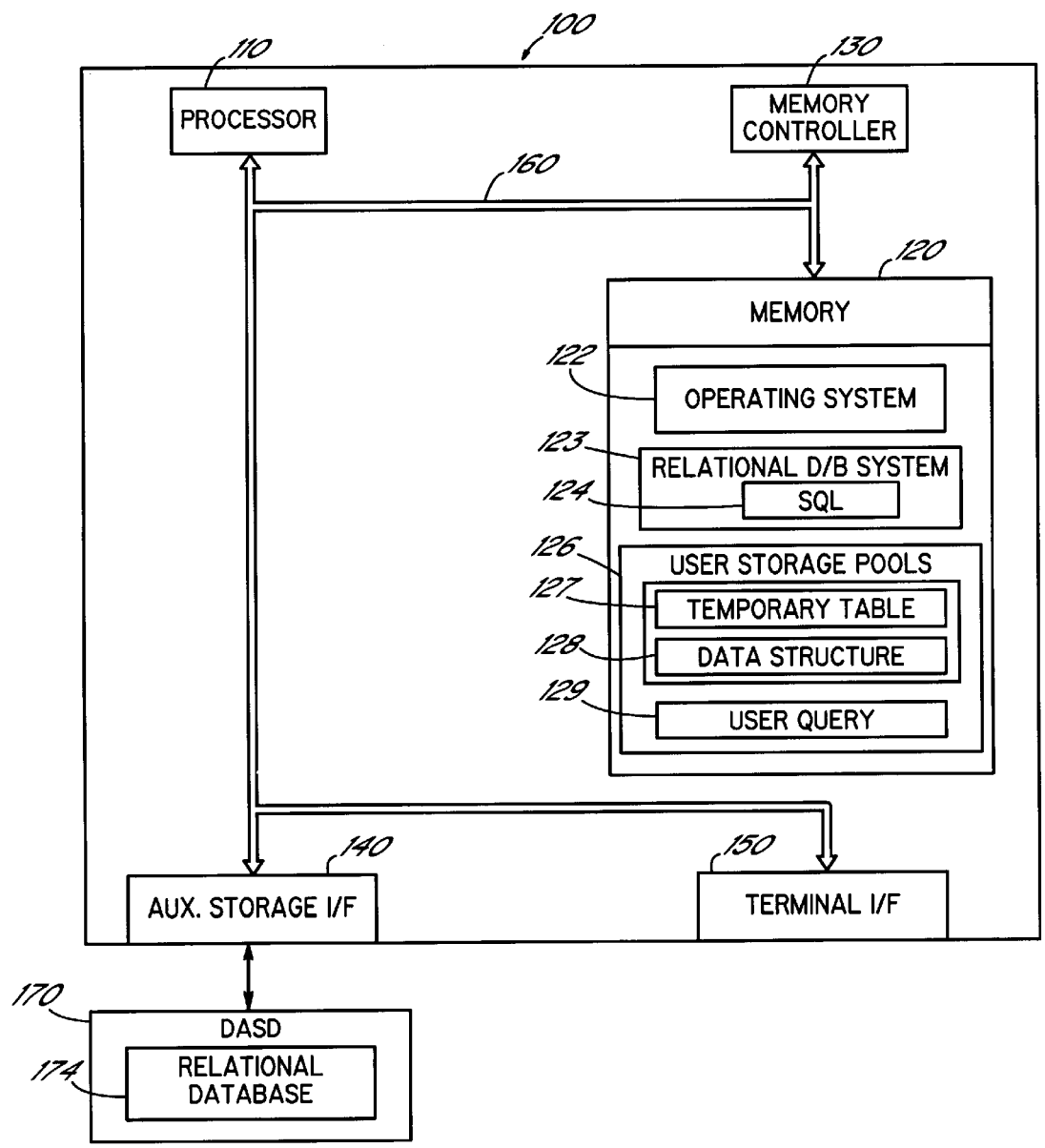
FIG. 1 is a block diagram of an apparatus according to an embodiment of the present invention.

The methods of the present invention employ computer-implemented routines to query information from a database. Referring now to FIG. 1, a block diagram of a computer system which can implement an embodiment of the present invention is shown. The computer system shown in FIG. 1 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database information 174 from auxiliary storage devices, such as magnetic disk (e.g., hard disks or floppy diskettes) or optical storage devices (e.g., CD-ROM). As shown in FIG. 1, one suitable storage device is a direct access storage device (DASD) 170. DASD 170 may alternatively be a floppy disk drive which may read programs and data such as relational database table 174 from a floppy disk. In this application, the term "backing storage" will be used to collectively refer to all types of storage devices, including disk drives, optical drives, tape drives, etc.

It is important to note that while the present invention has been (and will continue to be) described in the context of a fully functional computer system, those skilled in the art will appreciate that the mechanisms of the present invention are capable of being distributed as a program product for execution on a computer system, separately from the computer system itself. Such a program product can be distributed in a variety of forms, and the present invention applies equally regardless of the particular type of signal bearing media to actually carry out the distribution. Examples of signal bearing media include: recordable type media such as floppy disks (e.g., a floppy disk) and CD-ROMS and CD-RW, and transmission type media such as digital and analog communication links, including wireless communication links.

Memory controller 130, through use of a processor, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and/or multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 126. Relational database system 123 includes structured query language (SQL) interface 124, which is an interactive query and report writing interface. Those skilled in the art will realize that SQL interface 124 could reside independent of relational database system 123, in a separate memory location.

User storage pools 126 include temporary tables 127 and other data structures 128, and a user query 129. Temporary tables 127 and data structures 128 are created in response to a user query 129, which is a request for information from the relational database stored in DASD 170. The methods of the present invention do not necessarily require that the entire relational database be loaded into memory 120 to obtain the information requested in user query 129. Instead, only portions of the relational database, may be loaded into memory 120 and processed to provide relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide a request for information in a useful form by creating a user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The attribute (field) name(s) associated with the information are verified to exist in the relational database. And, the SQL commands in user query 129 are reviewed by optimization software in relational database system 123 to determine the most efficient manner in which to process the user's request.

In an embodiment of the invention described below, the front-end processing of user query 129 includes checking and establishing record locks for each record in a transaction to be conducted in response to a user query 129. Specific operations that are performed for this process will be described in detail below. Initially, however, for purposes of the following discussion of the use of the computer system of FIG. 1, the following definitions of terms are provided.

Update: modification of the content of a record through an update transaction.

Locked read: extraction of data from a record through a transaction that does not permit the retrieval of uncommitted results from records.

Unlocked (weakly locked) read: extraction of data from record through a transaction that does permit the retrieval of uncommitted results from records.

Process level lock: a record lock applied to a record, that is associated with a process P that is performing a transaction upon that record, but is not associated with any specific thread of a process.

Thread level lock: a record lock applied to a record, that is associated with a process P that is performing a transaction upon that record, and which is further associated with a specific thread of that process.

Weak lock: a record lock applied to a record that is associated with a process P that is performing an unlocked read transaction upon that record, and which is associated with a specific thread of that process.

Transaction: a sequence of read or update operations performed upon records, which are to be performed together to maintain consistency of data in a relational database system.

Referring now to Table 1, the relative relationships between read locks, weak locks and update locks at the process and thread levels, can be explained. Table 1 illustrates those conditions in which a conflict will be indicated, upon a request for a lock by a process P1 and/or thread T1.

|  | P1 requests read lock | P1 requests update lock | P1.T1 requests read lock | P1.T1 requests update lock | P1.T1 requests weak lock |
|---|---|---|---|---|---|
| P1 holds read lock |  |  |  |  |  |
| P1 holds update lock |  | Conflict |  | Conflict |  |
| P2 holds read lock |  | Conflict |  | Conflict |  |
| P2 holds update lock | Conflict | Conflict | Conflict | Conflict |  |
| P1.T1 holds read lock |  |  |  |  |  |
| P1.T1 holds update lock |  | Conflict |  | Should not occur, treated as a Conflict |  |
| P1.T1 holds weak lock |  |  |  |  |  |
| P1.T2 holds read lock |  |  |  | Conflict |  |
| P1.T2 holds update lock |  | Conflict | Conflict | Conflict | Conflict |
| P1.T2 holds weak lock |  |  |  | Conflict |  |

-continued

|  | P1 requests read lock | P1 requests update lock | P1.T1 requests read lock | P1.T1 requests update lock | P1.T1 requests weak lock |
|---|---|---|---|---|---|
| P2.T1 holds read lock |  | Conflict |  | Conflict |  |
| P2.T1 holds update lock | Conflict | Conflict | Conflict | Conflict | Conflict |
| P2.T1 holds weak lock |  |  |  | Conflict |  |

Figure 2A:
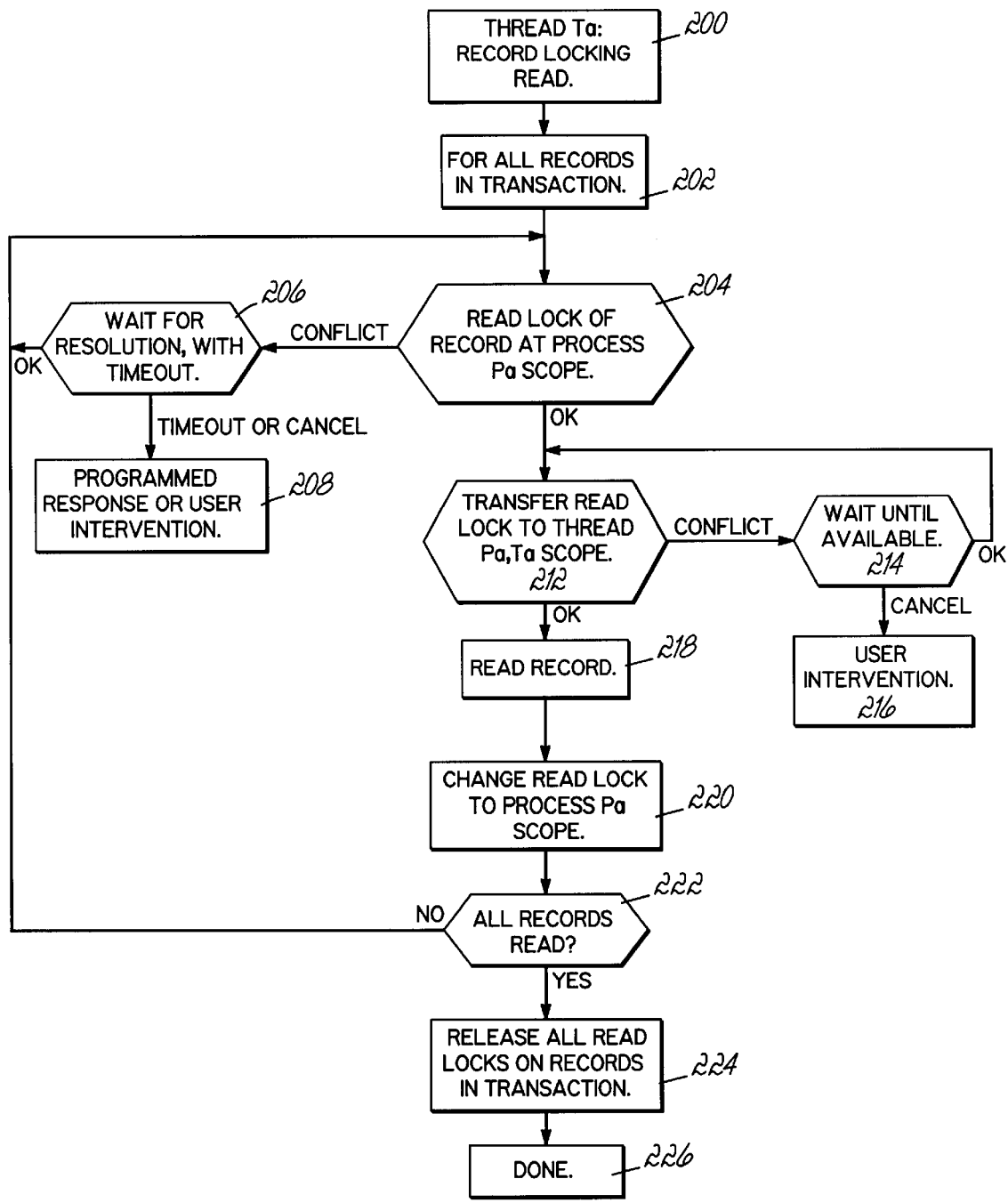
FIG. 2A is a flow chart of a process for managing a record locking read transaction in accordance with principles of the present invention.

As seen in the first column of Table 1, when a process requests a read lock for a record, that request will be granted, unless another process holds an update lock on that record. Elaborating on this point, it will be noted that a process requesting a read lock may obtain the read lock, even if that same process has an update lock on the record. This is true because (as illustrated in FIG. 2A, below) a process having already obtained a read lock on a record at the process level, must subsequently transfer the read lock to the thread level, before data may be extracted from the record. In many circumstances, a record will not be simultaneously accessed for reading and updating by the same process, even though a read lock and update lock are held by the process for that record. For this reason, when a thread requests a read lock on a record on behalf of its process, that request is not denied even though the same process may hold an update lock on the same record.

Referring now to the second column in Table 1, one can see the conditions in which a conflict is indicated upon a request for an update lock on behalf of a process. Specifically, when a thread requests a process-level update lock for a record, the update lock will be denied if that process or any other process holds an update lock on the record, or if any other process holds a read lock on the record. Here again, the thread requesting an update lock may obtain a process-level update lock even if its process has a read lock on the record. Furthermore, a thread requesting an update lock may obtain a process-level update lock even if its process has a read lock or a weak lock on the record at the thread level. This acceptable because a thread, having obtained an update lock on a record at the process level, must subsequently obtain an update lock on the record at the thread level before the record may be updated. In many circumstances, the record will not be simultaneously accessed for reading and updating by threads in the same process, even though a read or weak lock and update lock are held by the process for that record.

Referring to the third column of table 1, it can be seen that a thread requesting a thread-level read lock will only be conflicted from obtaining a read lock if another process, or another thread of the same process, holds an update lock on the same record. If the same thread holds an update lock on the same record, no conflict will be indicated, even though there is apparent conflict, for the reason that the same thread is performing the request for a read and the request for an update, which implies an inherent serialization of the update and read of that data, and therefore implies that there will be no conflict.

Referring to the fourth column of table 1, it can be seen that a thread requesting an thread-level update lock will be conflicted in any case where another thread or another process holds an update lock or read lock on the same record. In the event that the same process holds a read lock, or the same thread holds a read lock or weak lock on the record, no conflict will be indicated, even though there is apparent conflict, for the reason that the same thread is performing the update and the read, which implies an inherent serialization of the update and read of that data, and therefore implies that there will be no conflict.

Referring to the fifth column of table 1, it can be seen that a thread requesting a (thread level) weak lock will be conflicted only where another thread of the same process, or a thread of another process, holds an update lock on the record. As noted above, a thread may perform an update of the record by obtaining an update lock on the record at the thread level. Because an unlocked read may retrieve uncommitted changes to records, it is not necessary to conflict the request for a weak lock with any read locks on the record, or any process level update locks on the record, for the reason that the record will only be updated when a thread of the same or another process holds a thread-level update lock on the record. It will be noted that in the event the same thread holds an update lock, at the time that a weak lock is requested for a record, no conflict will be indicated, even though there is an apparent conflict, for the reason that the same thread is performing the update and read, which implies an inherent serialization of the update and read of that data, and therefore implies that there will be no conflict.

Figure 2B:
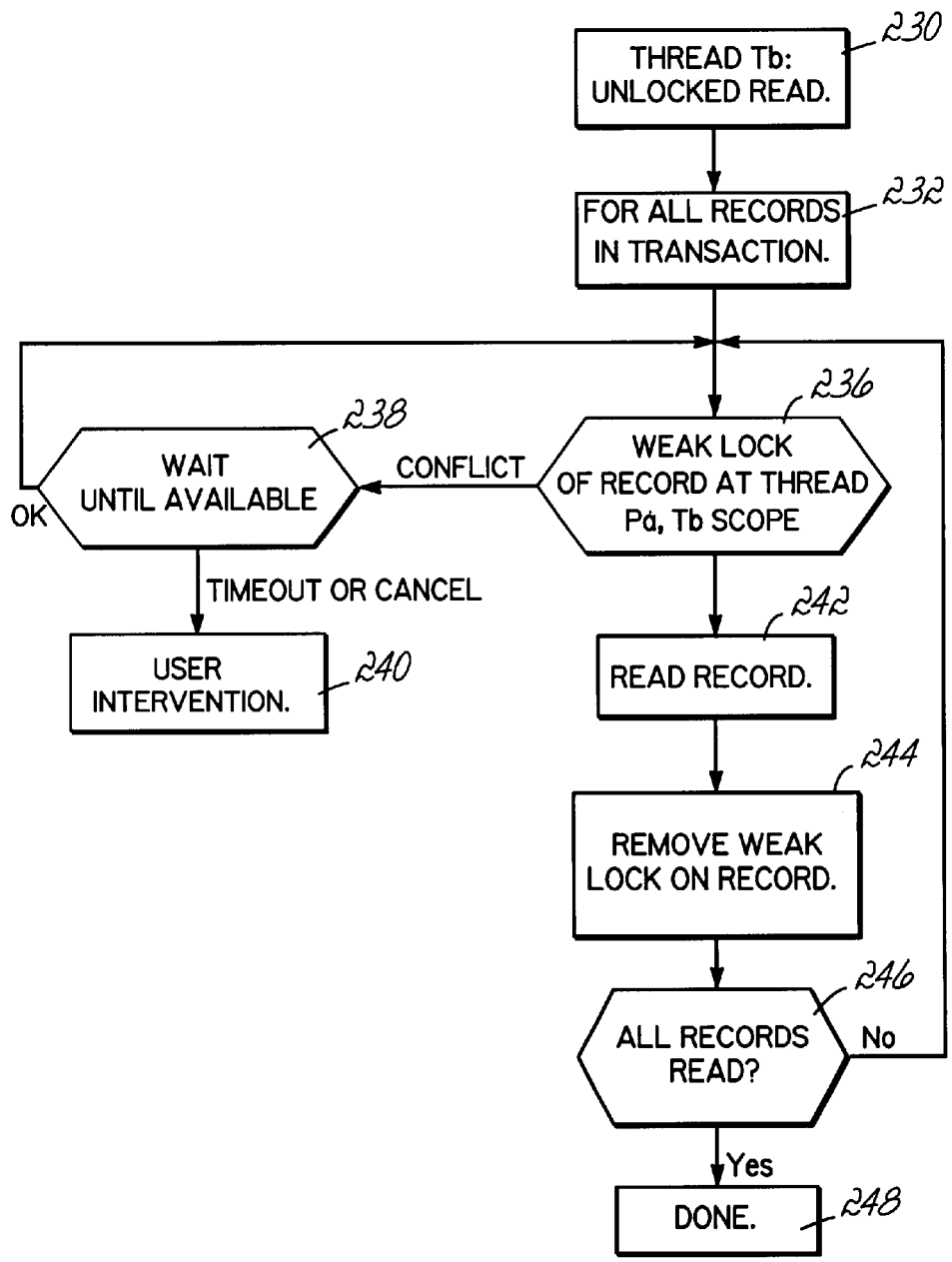
FIG. 2B is a flow chart of a process for managing an unlocked (weakly locked) read transaction in accordance with principles of the present invention.
Figure 2C:
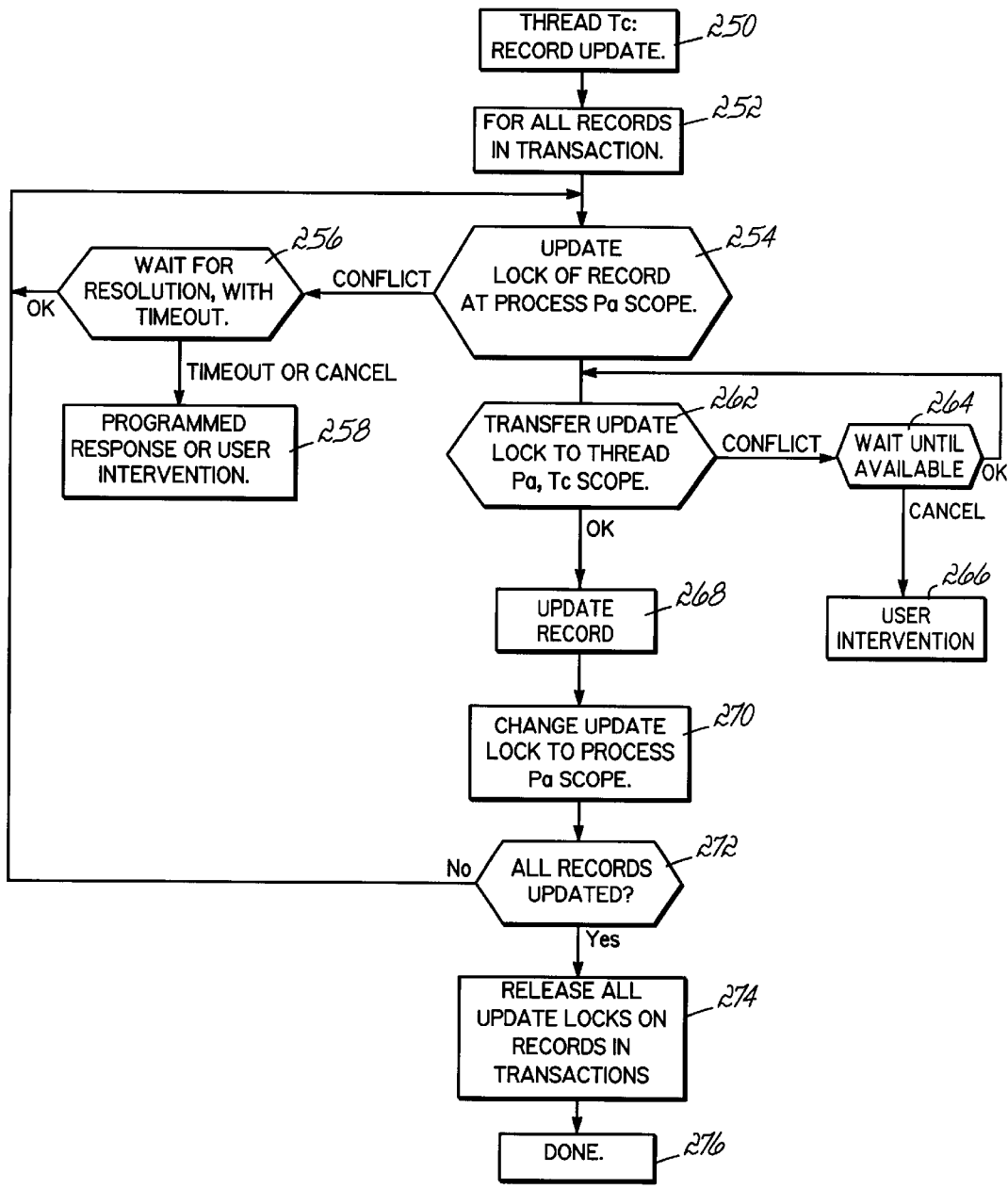
FIG. 2C is a flow chart of a process for managing an update transaction in accordance with principles of the present invention.

Referring now to FIG. 2A, a process for performing locked read transactions can be explained. As illustrated in FIGS. 2A, 2B and 2C, an exemplary process Pa has a number of threads Ta, Tb and Tc. FIG. 2A illustrates a thread Ta 200 which is a record locking thread, i.e., it performs a complete read transaction upon records in a relational database system and returns consistent results by virtue of the use of record locking. Records are selected for processing by the thread, and then locked, and processed. In repeated passes through a sequence of steps 202 through 220, thread Ta analyzes each record in the relational database to identify those subject to the transaction, and locks each record for read access at the process level. As shown at step 202, this sequence of steps is performed for each record affected by the transaction.

In a first step 204, a read lock is requested for a record by thread Ta, at the scope of its process Pa. If this request generates a conflict, in accordance with Table 1 above, then, in step 206, thread Ta will wait for a given timeout time, for the conflict to be resolved and the record to become available. If the record becomes available before a time out, processing returns from step 206 to step 204, and the record is locked. If there is a timeout, then processing continues from step 206 to step 208, where a programmed response is made (i.e., the transaction is canceled along with a message to the user to that effect), or user intervention is requested and obtained. Generally, user intervention may involve notifying the user that a conflict is preventing the thread from continuing. The user may cancel, or request continued retries, or take other action. The user may also cancel the transaction at other times, such as during the wait of step 206, in which case, again, user intervention will occur at step 208.

Once a record subject to the read transaction has been successfully locked at the process level in step 204, then a sequence of steps 212 through 220 is performed, to lock the record at the thread level in accordance with principles of the present invention. In a first step 212, the read lock of the record is transferred to the thread level Pa,Ta. If transferring the read lock to a thread level generates a conflict, then in step 214, the thread Ta waits until the record is available.

When the record becomes available for thread-level locking, processing returns to step 212 and the record lock is transferred to the thread level. Here again, the user may cancel the wait of step 214, in which case processing continues to step 216 where user intervention may take place. When a successful thread level lock has been established in step 212, processing proceeds from step 212 to step 218, in which the record is read. After the record has been read, in step 220, the read lock on the record is changed back to a process level Pa scope. Then, in step 222, it is determined whether all records have been read for the read transaction. If not, processing returns to step 204 to continue reading records. When all records have been read, processing proceeds from step 222 to step 224, in which step all (process level) read locks on records subject to the transaction are removed. At that point, the transaction and the corresponding record commit cycle is done 226.

Referring now to FIG. 2B, a process for performing unlocked (weakly locked) read transactions can be explained. FIG. 2B illustrates a thread Tb 230 which is a weakly locking thread, i.e., it performs a read transaction upon records in a relational database system and returns results which may include uncommitted changes. As seen at step 232, thread Tb reads each record in the relational database in a sequence of steps 236 through 242, in accordance with principles of the present invention.

In a first step 236, a weak lock of a record is requested at the thread level Pa,Tb. If the weak lock generates a conflict, then in step 238, the thread Tb waits for the record to become available. When the record becomes available for weak locking, processing returns from step 238 to step 236, in which the weak lock is established. (The user may cancel the wait of step 238, for user intervention in step 240, as discussed above.)

After a weak lock has been successfully established in step 240, in step 242, the record is read. After the record has been read, in step 244, the weak lock on the record is removed. Then, in step 246, it is determined whether all records have been read for the unlocked read transaction. If not, processing returns to step 236 to continue weak locking and reading of records. When all records have been read, processing proceeds from step 246 to step 248, at which point, the transaction is done.

Referring now to FIG. 2C, a process for performing locked update transactions can be explained. FIG. 2C illustrates a thread Tc 250 which is a record updating thread. In a series of steps 252 through 270, thread Tc locks each record for update access by the thread Tc. As shown at step 252, this sequence of steps is performed for each record affected by the transaction. In a first step 254, thread Tc update locks a record at the scope of its process Pa. If this request generates a conflict, in accordance with Table 1 above, then in step 256, thread Tc waits for an update lock to be available. If the record can be update locked, then processing returns from step 256 to step 254 to update lock the record. If the wait of step 256 times out, or is canceled by the user, then a programmed response and/or user intervention may occur, as represented by step 258. The nature of the programmed response or user intervention may vary in different circumstances, as determined by the application. Specifically, before the update transaction can be canceled, it may be necessary to undo changes made to those records that have been updated thus far. Alternatively, the user, and/or a programmed response, may determine that updates that have been done can be left in place, thus in effect reforming the transaction to encompass only the updates that have been completed. (If it is deemed necessary to undo updates that have been done, then the process level lock on each record to be un-updated, is changed to the thread level, then the record is un-updated, and then the thread level lock is changed to the process level, in a sequence of steps identical to that used for the update itself, as explained below in connection with steps 262 through 270.)

Once a record subject to the update transaction has been locked at the process level, then a sequence of steps 262 through 270 is performed, to update each individual record in accordance with principles of the present invention. In a first step 262, the process level update lock of the record is transferred to the thread level Pa,Tc. If the transfer of the update lock generates a conflict, then in step 264, the thread Tc waits until the record is available. When the record becomes available, processing returns from step 264 to step 262, in which the update lock of a record is changed to the thread level Pa,Tc. The user may also cancel the wait, initiating user intervention in step 266 (which may involve un-updating records, as noted above).

Once a record has been update locked at the thread level, in step 268, the record is updated. After the record has been updated, in step 270, the update lock on the record is changed back to a process level scope Pa. Then, in step 272, it is determined whether all records have been updated for the update transaction. If not, processing returns to step 254 to continue updating records. When all records have been updated, processing proceeds from step 272 to step 274, in which step all (process level) update locks on records subject to the transaction are removed. At that point, the transaction and the corresponding record commit cycle is done 276.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, threads may perform both read and update operations, in which case the lock sequences described in FIGS. 2A, 2B and 2C may be combined, as needed. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of locking records in a multi-process or multi-user database system, comprising:
   locking records affected by an update transaction, including a particular record, as part of executing the update transaction,
   while the particular record is locked for updating, reading the particular record as part of a transaction that will accept uncommitted changes, through the steps of weakly locking the particular record, and then reading the particular record,
   wherein, while the particular record is weakly locked, the record cannot be updated by the update transaction.

2. The method of claim 1 wherein records are locked in association with a process or thread performing a lock.

3. The method of claim 1 wherein a record affected by a transaction is initially locked for reading or updating at a process level.

4. The method of claim 1 wherein, when a particular record is to be read or updated as part of a transaction, it is locked at a thread level.

5. The method of claim 4 wherein a record is weakly locked at the thread level for reading, for the purposes of a read transaction that will accept uncommitted changes.

6. The method of claim 5 wherein a record may be weakly locked for reading so long as the record is not locked for updating at the thread level.

7. The method of claim 5 wherein a record which is weakly locked for reading, cannot be locked for updating at the thread level.

8. A multi-process or multi-user database system implementing record locking for transactional integrity, comprising:

a computer having a memory and a data storage device coupled thereto, wherein the data storage device stores a relational database, the relational database comprising one or more records, each record associated with one or more access locks, a processor processing an update or read transaction in response to a query, by locking records affected by the update transaction, including a particular record, as part of executing the update transaction, and while the particular record is locked for updating, reading the particular record as part of a transaction that will accept uncommitted changes, through the steps of weakly locking the particular record, and then reading the particular record, wherein, while the particular record is weakly locked, the processor cannot update the particular record as part of the update transaction.

9. The system of claim 8 wherein said processor locks a record in association with a process or thread performing a lock.

10. The system of claim 8 wherein said processor initially locks records affected by a transaction for reading or updating at a process level.

11. The system of claim 8 wherein, when a particular record is to be read or updated by said processor as part of a transaction, it is locked at a thread level.

12. The system of claim 11 wherein said processor weakly locks a record for reading at the thread level, for the purposes of a read transaction that will accept uncommitted changes.

13. The system of claim 12 wherein said processor weakly locks a record for reading so long as the record is not locked for updating at the thread level.

14. The system of claim 12 wherein said processor cannot lock a record for updating at the thread level, when the record is weakly locked for reading.

15. A program product for use in a multi-process or multi-user database system, comprising:

a program for implementing the database system, including routines for locking records, the routines locking records affected by an update transaction, including a particular record, at the beginning of the update transaction, and while the particular record is locked for updating, reading the particular record as part of a transaction that will accept uncommitted changes, through the steps of weakly locking the particular record, and then reading the particular record, wherein, while the particular record is weakly locked, the routines will not update the record in an update transaction, and a signal-bearing medium bearing the program.

16. The program product of claim 15 wherein said medium is a storage medium.

17. The program product of claim 15 wherein said medium is a transmission-type medium.

18. The program product of claim 15 wherein, when a particular record is to be read or updated as part of a transaction, said routines lock the record at a thread level.

19. The system of claim 18 wherein said routines weakly lock a record for reading so long as the record is not locked for updating at the thread level.

20. The system of claim 19 wherein said routines will not lock a record for updating at the thread level when the record is weakly locked for reading.

* * * * *